Dec. 17, 1968  P. J. HUBBARD  3,416,669
FILTER BACKWASH MEANS
Filed April 7, 1967  7 Sheets-Sheet 1

INVENTOR.
PETER J. HUBBARD
BY Theodore H. Jablon
ATTORNEY.

Dec. 17, 1968  P. J. HUBBARD  3,416,669
FILTER BACKWASH MEANS
Filed April 7, 1967  7 Sheets-Sheet 2
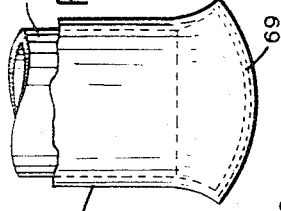
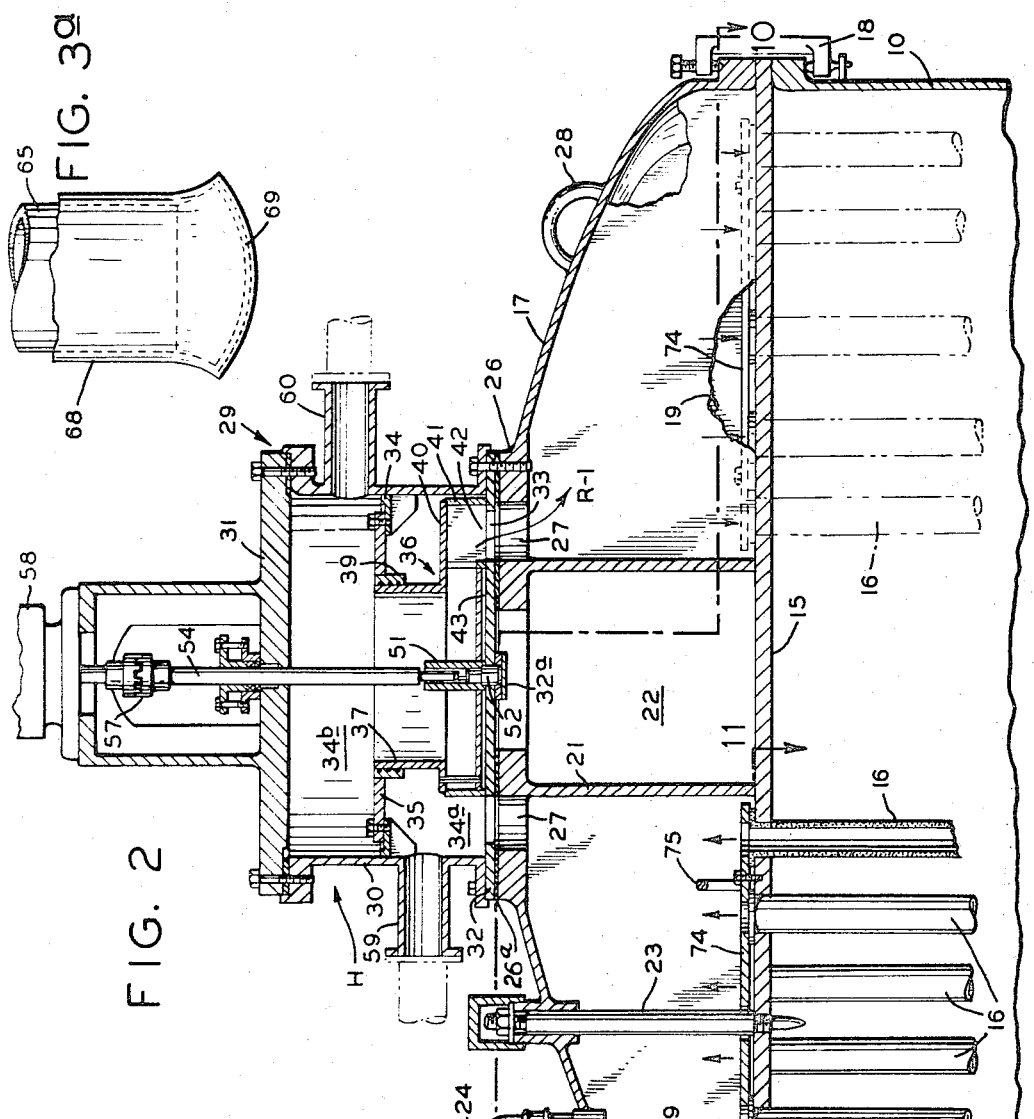
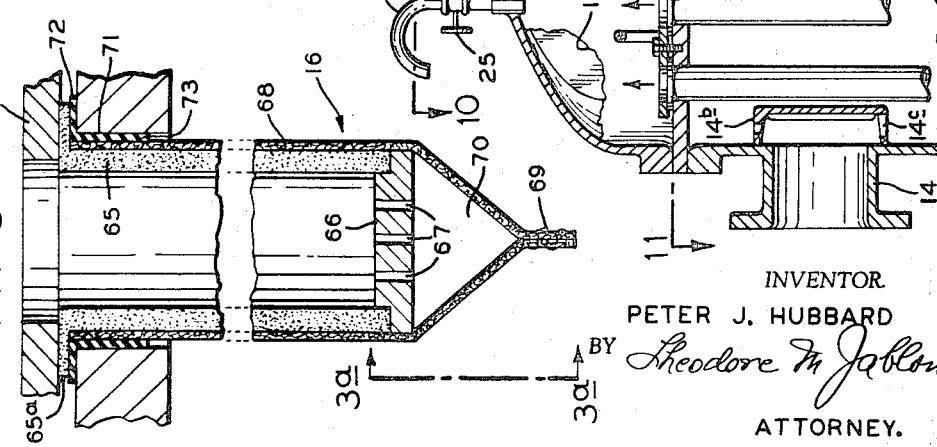
INVENTOR.
PETER J. HUBBARD
BY *Theodore M. Jablon*
ATTORNEY.

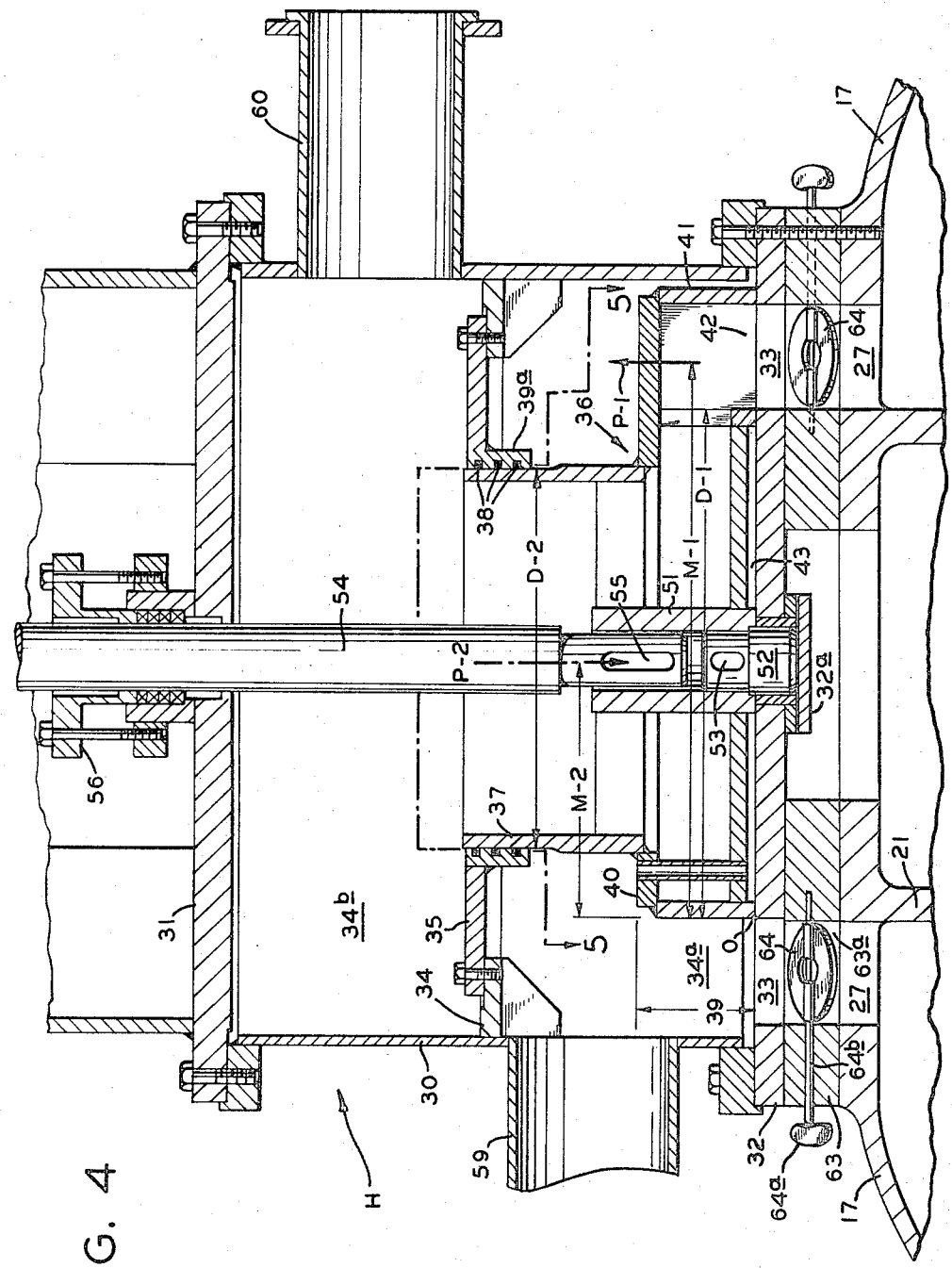

Dec. 17, 1968  P. J. HUBBARD  3,416,669
FILTER BACKWASH MEANS
Filed April 7, 1967  7 Sheets-Sheet 4

INVENTOR.
PETER J. HUBBARD
BY: Theodore M. Jablon
ATTORNEY.

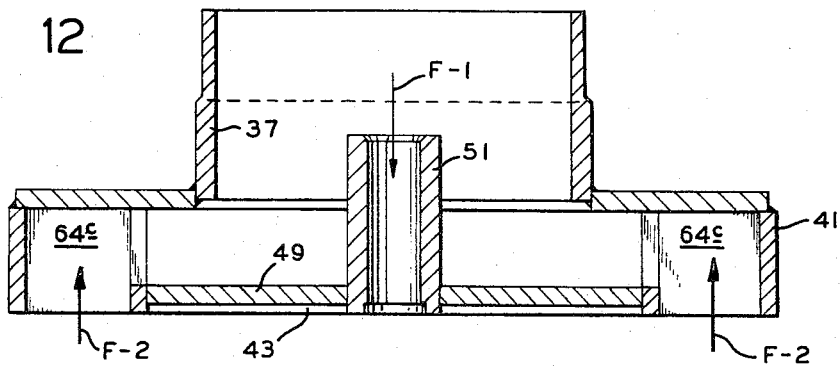
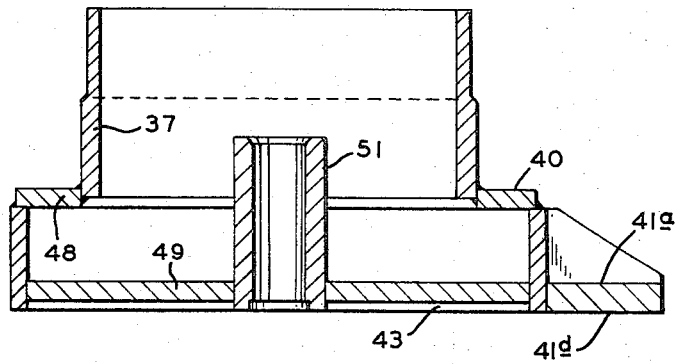
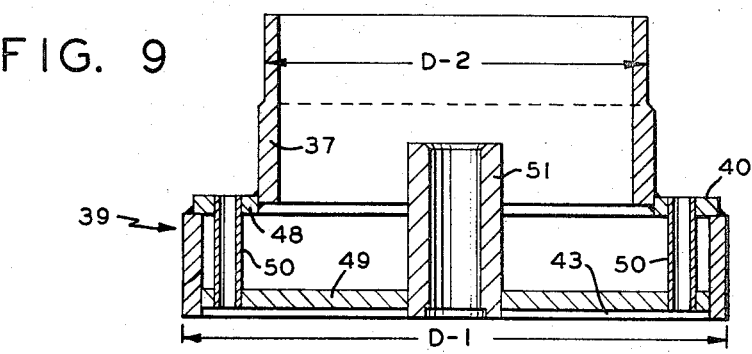
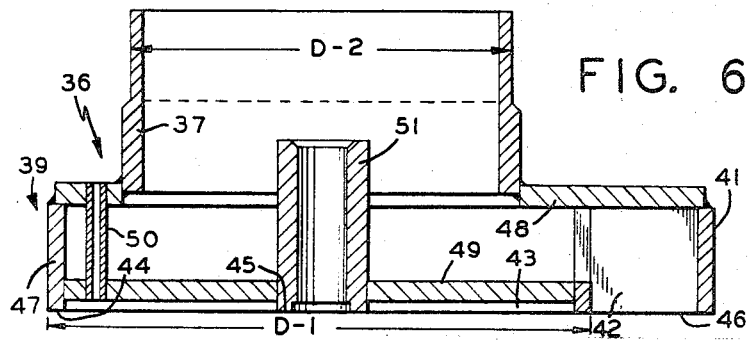

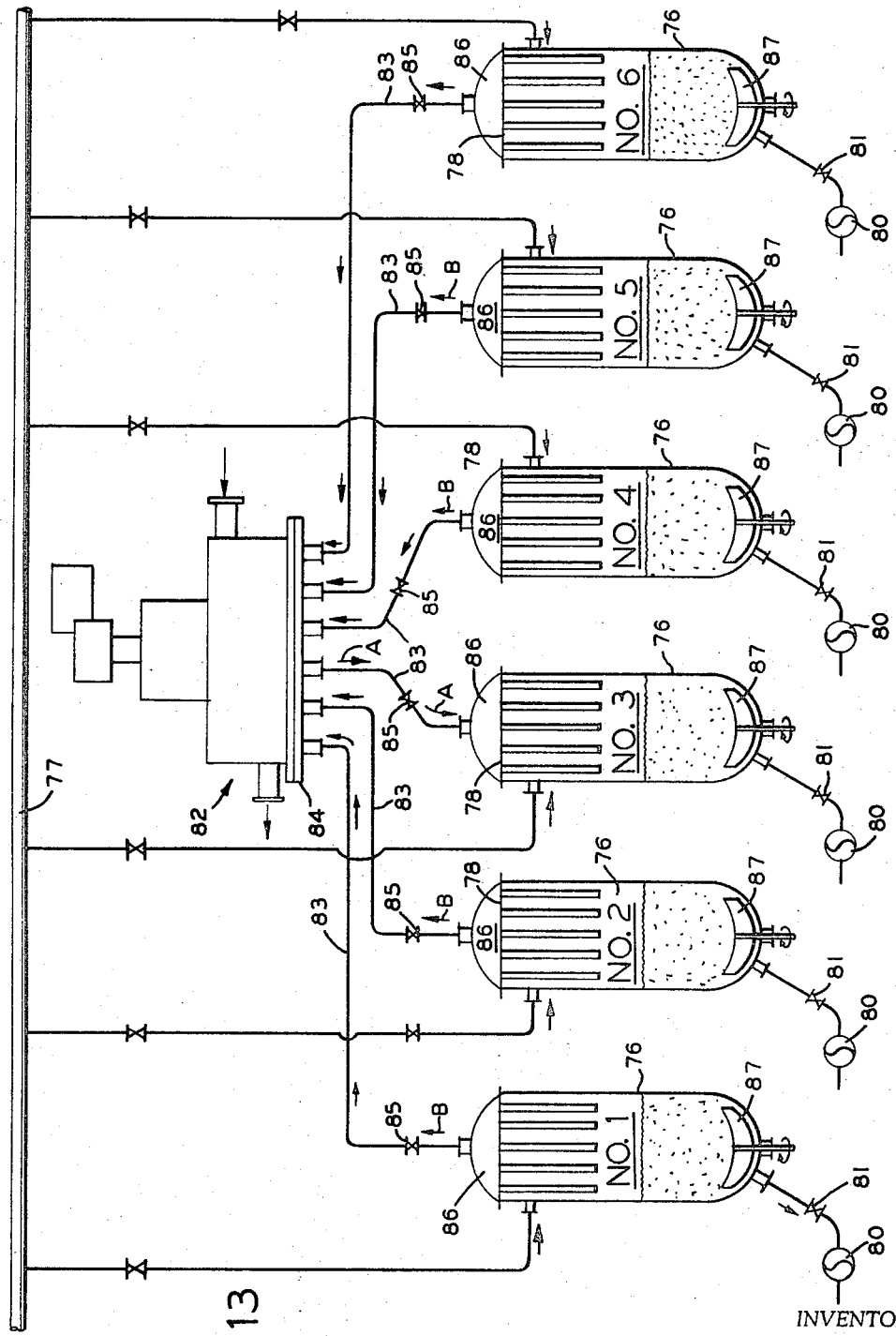

United States Patent Office

3,416,669
Patented Dec. 17, 1968

3,416,669
FILTER BACKWASH MEANS
Peter J. Hubbard, Norwalk, Conn., assignor to Dorr-Oliver Incorporated, Stamford, Conn., a corporation of Delaware
Filed Apr. 7, 1967, Ser. No. 629,288
11 Claims. (Cl. 210—333)

ABSTRACT OF THE DISCLOSURE

In a filter apparatus wherein plural groups of depending filter tubes have their upper ends connected to corresponding plural filtrate receiving chambers; a backwash valve comprising a valve housing supported on a valve plate and divided by a transverse partition into an upper backwash feed chamber and a lower filtrate receiving chamber, and a rotary valve member having a cylindrical neck portion centrally seated in the partition and a hollow body portion having a bottom in operating contact with the valve plate and an outlet portion extending radially from the body portion with a bottom co-planar therewith.

---

More particularly, this invention relates to improvements in the apparatus disclosed in the co-pending patent application of Harry V. Miles, Ser. No. 450,119, filed Apr. 22, 1965, now U.S. Patent No. 3,356,215. The Miles invention features a filtration-thickening operation which may be carried out continuously by means of a rotating valve which supplies back wash liquid sequentially to the respective filtrate receiving chambers of a plurality of filtration zones which receive a pressurized feed suspension from a common source.

The co-pending application discloses a filtration-thickening unit which comprises a tank to which the solids suspension or slurry is supplied under pressure; discharge means for delivering thickened sludge; a horizontal tube plate closing the top of the tank; filter tubes depending from the tube plate for delivering filtrate liquid upwardly through the plate; a hollow cover member or inverted shell having radial partitions arranged so as to constitute with the plate a corresponding number of sector-shaped filtrate receiver chambers each of which communicates with a group of the filter tubes depending from the tube plate; and a control valve construction for sequentially connecting each filtrate receiving chamber and thus each group of the filter tubes to a reverse flow of back wash liquid at a pressure exceeding the pressure of the slurry feed.

The valve construction comprises a horizontal stationary valve plate which has port holes evenly spaced in a circle around a preferably vertical axis, and communicating with respective filtrate receiving chambers. A rotary conduit or hollow valve member turntable about this vertical axis sequentially connects the port openings with a source of pressurized back wash liquid.

A valve housing is mounted upon the valve plate surrounding the port opening as well as the rotary valve member. The housing has an inlet connection for continuously feeding pressurized wash liquid into the valve member, and a discharge connection for delivering collected filtrate liquid from the housing.

In such a valve construction the pressure reaction force from the back wash liquid acting upon the outer or discharge end of the rotary valve member tends to lift this member out of its necessary working contact with the valve plate, while also imposing undue bending stress upon a vertical shaft that rotates the valve member extending upwardly through the top of the housing.

It is an object of this invention to provide an improved control valve construction wherein the aforementioned reaction force is hydraulically compensated by utilizing the back wash liquid pressure itself, to the extent that working contact is maintained between the valve plate and the rotary valve member.

The foregoing object is attained in the improved valve construction wherein the housing has a horizontal annular partition wall substantially dividing the housing into an upper receiving chamber for the pressurized back wash liquid and a lower collecting chamber for the filtrate liquid.

The rotary valve member has an upwardly open cylindrical neck or inlet end portion concentric with the vertical axis, in sealing relationship with the central opening of the annular partition. The lower end of the neck portion is connected to a hollow body portion having a bottom in face-to-face contact with the central area of the valve plate, which is the area surrounded by the port openings. The body portion has a hollow radial extension or outlet end portion in face-to-face contact with the valve plate, and provided with a bottom opening sequentially registering with the port openings incident to rotation of the valve member.

In the operation of this valve member according to the invention, while back wash liquid under pressure passes from the upper chamber of the housing through the valve member sequentially through the port openings of the valve plate and thus to the respective groups of filter tubes, face-to-face operating contact between the parts is maintained by a net downward pressure effect acting through the neck of the valve member in excess of the upward pressure effect from the area of the bottom opening of the valve member. This net downward pressure effect is attained by providing adequate excess pressure area in the inlet neck portion of the valve member.

The valve member may have a single radial lateral extension, and be so constructed that the moment of the upwardly directed pressure force about the opposite bottom edge of the valve member is exceeded by the leverage or moment of the downwardly directed pressure force, or the valve member may have a plurality of radial extensions evenly spaced from one another about the axis to cooperate with the port openings, and so constructed that the downwardly directed central force dimensioned will safetly exceed the sum total of the upwardly directed forces.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

FIG. 2 is an enlarged fragmentary view of the top end portion of the unit of FIG. 1, including the valve construction and other details.

FIG. 3 is a greatly enlarged detail of one of the depending filter tubes of the unit.

FIG. 3a is a further detail view of the lower end portion of the filter tube, taken on line 3a—3a of FIG. 3.

FIG. 4 is a further enlarged view of the valve construction taken from FIG. 2.

FIG. 6 is a vertical sectional view of the rotary valve member taken on line 6—6 of FIG. 5.

FIG. 8 is a vertical sectional view of the rotary valve member, taken on line 8—8 of FIG. 5.

FIG. 9 is a vertical sectional view of the rotary valve member, taken on line 9—9 of FIG. 5.

FIG. 12 shows a modified form of the rotary valve member.

FIG. 13 shows the control valve construction in another arrangement.

Figure 1:
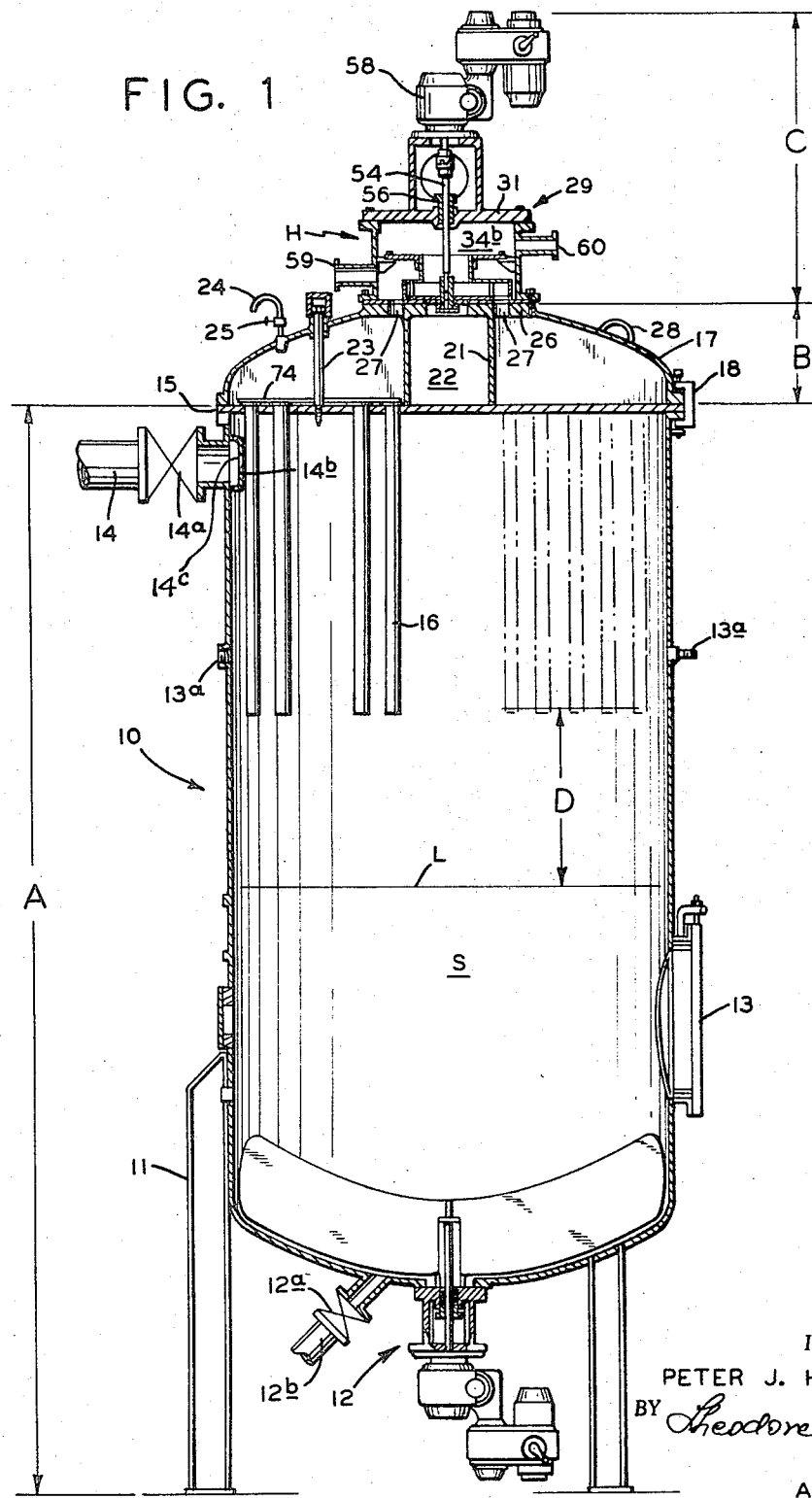
FIG. 1 is a vertical sectional view of a filtration-thickening unit embodying the improved control valve construction including a rotary valve member.
Figure 5:
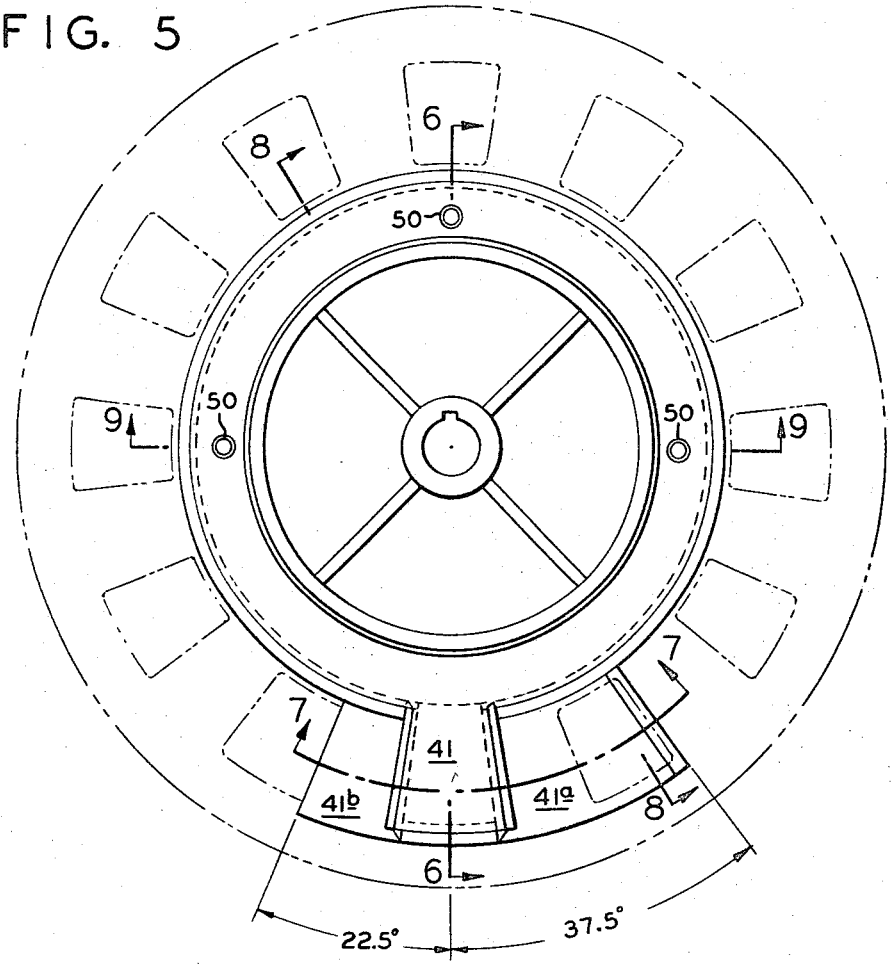
FIG. 5 is a detail plan view of the rotary valve member, taken on line 5—5 in FIG. 4.
Figure 7:
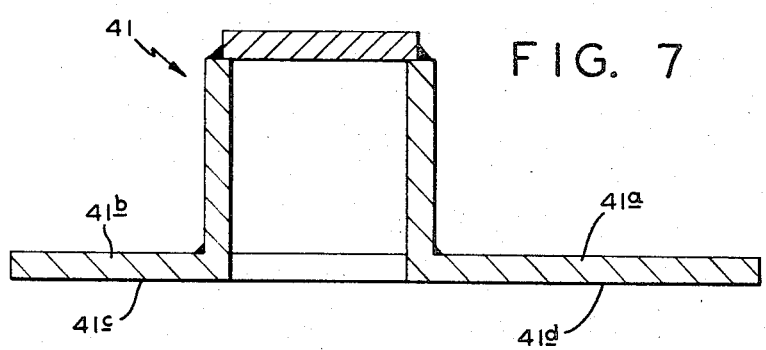
FIG. 7 is a detail sectional view of the rotary valve member taken on line 7—7 of FIG. 5.

In the embodiment illustrated in FIG. 1 the filtration-thickening apparatus comprises three main sections, (A), (B), (C):

In section (A) a pressure filtration tank surrounds a cluster of numerous hollow upwardly open elongate filter elements. These filter elements or filter tubes are subjected to periods of pressure filtration to accumulate a layer of suspension solids on the outer surface of these elements, alternating with periods of back washing to effect the release of the layers of solids as well as the cleansing of the filter media.

In section (B) a cluster of filtrate receiver chambers are disposed around a vertical axis communicating each with a group of the filter elements.

In section (C) provision is made for continuously collecting the filtrate liquid while sequentially and cyclically back washing the groups of filter elements, by employing a rotatable conduit member or rotary valve member actuated to sequentially establish flow connection from a back wash pressure liquid supply to each filtrate receiving chamber and thus to each group of the filter elements.

Section (A) of the apparatus comprises a cylindrical tank 10 supported on legs 11. In the tank bottom is mounted a variable-speed motor-driven agitator mechanism 12 for maintaining a bed S of heavy thickened sludge in a flowable condition for withdrawal through a control valve 12a provided in a discharge connection 12b. A lateral manhole 13 as well as various tap connections 13a are provided on the tank. A supply connection 14 with valve 14a for introducing the solids suspension to be thickened under pressure is provided near the top of the tank, delivering into a feed distributing conduit 14b which may extend peripherally along the inner surface of the tank, with discharge openings 14c spaced along this conduit.

The top end of the tank itself is closed by a plate member 15 to which are removably connected the upper ends of the numerous depending tubular filter elements 16 upon which a layer of suspension solids may be formed while filtrate liquid passes from the interior of these elements upwardly through the plate. Downwardly the filter elements terminate a distance D from what is indicated to be the potential maximum level L of the bed of settled thickened sludge, that distance being adequate to allow for the lumps or fragmented layer of solids when released from the filter elements to fall onto or into the bed of sludge.

Figure 10:
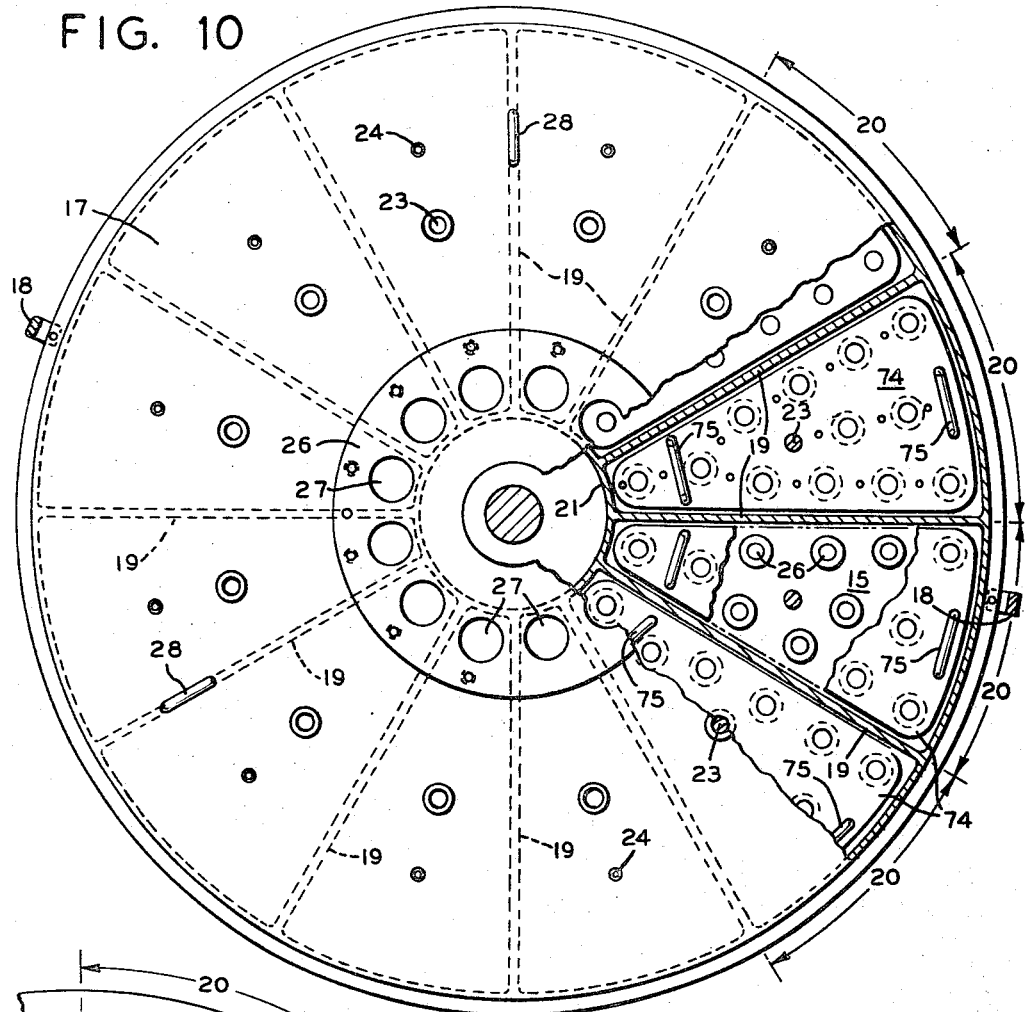
FIG. 10 is a horizontal cross-sectional view of the filtration-thickening unit, taken on line 10—10 in FIG. 2, showing the group-wise arrangement of the filter tubes, and other details.
Figure 11:
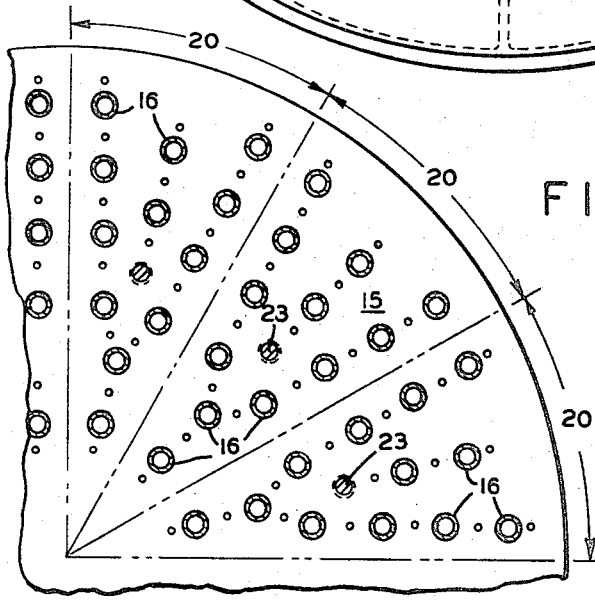
FIG. 11 is a fragmentary horizontal cross-sectional view of the unit, taken on line 11—11 in FIG. 2, showing the tube arrangement below the tube plate, in the tank.

Section (B) of the apparatus comprises a hollow cover or dished cover member 17 overlying the plate member 15 and marginally fastened thereto and to the top end of the tank by means of quick removable screw clamps 18. This cover member 17 has internal radial partitions 19 defining with the plate member 15 a cluster of filtrate receiving chambers 20 sector-shaped and disposed around the vertical axis of the tank (see FIG. 10). The inner narrow ends of these receiving chambers are bounded by a cylindrical vertical wall or tubular partition 21 which itself defines a central chamber 22. The cover member 15, and the top end of the tank with the plate 15 between them are held tightly together by means of screw clamps 18. The assembly and the relationship of the parts is such that the bottom edges of the partition means in the cover member close tightly upon the plate member 15.

Penetrating each filtrate receiving chamber 20 is a vertical anchoring bolt 23 for further securing the cover member and the bottom edges of the partition means tightly upon the plate member 15. Each chamber 20 further has a tap 24 with closure valve 25 through which the filtrate liquid from each of the chambers 20 may be sampled for testing of its clarity or turbidity as an indicator of possible defectiveness of any filter elements in the respective group served by the receiving chamber 20 being tested.

The dished and partitioned cover member 17 is formed at the top with a central horizontal plate portion 26 provided with a port 27 for each chamber 20. These ports 27 are arranged in a circle around the vertical axis of the tank, providing communication between each chamber 20 and the aforementioned filtrate collecting and back washing section (C) mounted atop the cover member 17. This cover member further has external eyes 28 whereby the entire top assembly comprising sections (B) and (C) may be conveniently lifted off the plate member 15 after removal of the screw clamps 18 for inspection of the filter elements. The mounting of the filter elements themselves and their particular construction will be described in more detail below.

In section (C) of this apparatus the valve construction 29 of this invention (see FIGS. 4 to 9) comprises a cylindrical housing wall 30 concentric with the vertical axis of the tank, a cover plate 31 closing the top end of the cylindrical wall, and a valve plate 32 fixed to the bottom end of the cylindrical wall, the parts 30, 31, and 32 together constituting a valve housing H. The valve plate has port openings 33 registering each with a respective port 27 of the domed partitioned cover member 17.

About midway between its ends the cylindrical housing wall has an internal annular shelf 34 to which is bolted an annular plate 35 constituting with the shelf an annular partition substantially defining in the housing a lower chamber 34a for receiving filtrate liquid through the ports 27 from the respective chambers 20 and thus from their respective groups of filter tubes, and an upper chamber 34b for receiving backwash liquid to be applied sequentially to the respective chambers 20 in the cover member and their respective groups of filter tubes. The upper chamber communicates sequentially with the respective port openings through a rotary distributing conduit or valve member 36 located in the lower chamber and turnable about the vertical axis of the tank while having sealing relationship with the central opening of the annular partition.

The valve member (see FIGS. 4 to 9) has an upwardly open inlet neck portion 37 in sealing relationship with the central opening of the annular partition, the seal itself being maintained by means of sealing rings 38 provided in a hub portion 39a of the annular partition.

The body portion 39 having a diameter D–1 larger than the diameter D–2 of the neck portion constitutes therewith an annular shoulder 40, and has laterally and radially extending therefrom an outlet end portion 41 provided with bottom opening 42 adapted to register and communicate sequentially with the ports 27 incident to rotation of the valve member about the vertical axis. The bottom faces of this body portion 39 and of the radial end portion 41 are co-planar and have face-to-face operating contact with the valve plate 32. The bottom of the valve member has a shallow annular recess 43 so that the actual working contact with the valve plate is provided by the outer peripheral bottom edge face 44, the inner annular bottom face 45 concentric with one another and with the axis, and the bottom face 46 of the radial end portion of the valve member.

Thus, the body portion of the valve member is formed by a substantially cylindrical wall 47, an annular top plate 48, and a bottom plate 49, with one or more tubular passages 50 provided for relief of pressure in the shallow bottom recess 43 as will be furthermore explained below.

At the leading side and at the trailing side the outlet end portion 41 of the valve member has wing plates 41a and 41b respectively providing blank-off bottom faces 41c and 41d respectively in contact with the valve plate 32, thereby ensuring proper control and utilization of the backwash liquid in the operation of the valve member.

The valve member also has a hub portion 51 rising internally from the bottom plate 49. A plug 52 is fitted tightly into the lower end of this hub portion secured by a key connection 53, for centering the valve member in the valve plate 32 in the manner shown in FIG. 4, with a closure plate 32a provided against leakage.

Loosely fitted into the upper end of hub portion 51 is the lower end of a vertical drive shaft 54 for rotating the valve member, rotation being transmitted by a key connection 55. This shaft extends upwardly through the top plate of the valve housing by way of the stuffing box 56. A coupling 57 connects this shaft to a variable speed drive motor 58 mounted upon the top plate of the housing.

The lower chamber 34a of the valve housing delivers filtrate liquid through a discharge connection 59, while the upper chamber 34b receives backwash liquid through a feed connection 60 under pressure greater than the feed pressure at which the pulp or slurry is supplied through the connection 14 into the tank.

According to the invention (see FIGS. 4 and 6) pressure of the backwash liquid is utilized within the valve housing for compensating an upward force P–1 resulting from the pressure area of the bottom opening 42 in the valve member. According to the invention this valve member is so constructed that the moment of the upward force P–1 about point "0" is exceeded by the moment of a downward force P–2 (shown in dot-and-dash) about point "0", the force P–2 resulting from the pressure are of diameter D–2 surrounded by the neck portion 37, exposed to the pressure of the backwash liquid. The two moments are indicated by the distances or leverages "M–1" and "M–2" respectively. Due to the provision of the aforementioned relief passages 50 no backwash pressure can build up in the shallow bottom recess 43 underneath the valve member, so that with the forces acting against each other as above set forth, proper operating contact is insured between the valve member and the valve plate 32.

Manually operable means are furthermore provide individually closing the respective port openings of the valve plate in order that any one of the groups of filter tubes may be rendered inoperative, for the purpose of locating defects in the filter tubes. For that purpose, the embodiment of FIG. 4 comprises an auxiliary plate 63 interposed between the valve plate 32 and the adjacent top face of the domed cover member 17 of the tank, with openings 63a in the auxiliary plate arranged to register with respective ports 27. Each of the openings 63a may be closed by a butterfly valve 64 operable by means of a knob or handle 64a fixed to a horizontal valve shaft 64b extending radially in the plate.

Referring to FIGS. 3 and 3a a filter tube or element 16 comprises a length of rigid tube 65 of porous material of substantial wall thickness, for example, porous polypropylene material which is largely resistant to the effect of chemicals and the effect to heat. The upper end of the rigid tube has bonded thereto a flange 65a while the lower end is closed by an end piece 66 firmly bonded to the tube and having perforations 67.

Closely surrounding the rigid tube is a sleeve 68 of flexible porous filter media material which may be in the nature of a suitable filter cloth or felt. The lower end of this tubular sleeve of filter media is closed for instance by a seam 69 and/or a bonding substance, thus forming a small downwardly pointed pocket 70 below the lower end of the rigid tube.

The upper end of the filter media sleeve 68 is connected to a flanged member 71 consisting of a flexibly resiliently deformable material such as a rubber type material. This flanged member has a flange portion 72 from which extends a cylindrical portion 73 which is perpherally firmly connected to the upper end of the filter sleeve as by a peripheral seam and/or a bonding substance. When a filter element thus composed is in place connected to the plate 15, the rigid tube flange 65a and the adjoining flexible flange 72 are held firmly in compression by a retainer plate 74 bolted down upon the plate 15, with the rubber flange portion 72 thus acting as a gasket for sealing the connection against the operating pressure in the tank. The retainer plates 74 one in each chamber 20, are of corresponding sector-shaped configuration as clearly seen in FIG. 10, which plates have handles 75 for lifting when the plates are being detached for inspection of the filter elements.

In the operation of the above described apparatus the length of the filtration period may be readily varied by varying the speed of rotation of the valve member.

In this apparatus the ratio of the length of the period of filtration to the length of the backwash period may be varied by varying the number of radial partitions in the cover member 17 whereby the number of filtrate receiving chambers 20 with their associated groups of filter elements, may be varied, along with a corresponding change of the number of port openings in the valve plate 32. The movement of the rotary backwash conduit member or valve member may be continuous or it may be in steps from one port opening 33 to the next.

The continuous filtration-thickening unit of this invention is particularly suited for thickening suspensions which may require short filtration cycles, that is where the filtration periods must be relatively short due to the nature of the solids in the suspension. This problem is readily met by the choice of an adequate speed of the rotary backwash distributing valve member. An example for such a condition is found when thickening the so-called "White Liquor" derived from paper pulp digestion wherein finely divided calcium carbonate is suspended in a caustic liquor, to effect the separation and recovery for re-use of the solution separate from the finely divided calcium carbonate which in turn may also be re-useable. In such an instance, the period of filtration may only be long enough to allow a relatively thin dense layer of these fine solids to be formed upon the filter elements, which layer must be released in order to be followed by a thorough cleansing reverse flow of backwash liquor through the filter media while the same are in an expanded state. In that state, particles can be readily dislodged from the expanded pores of the filter media, as back wash liquor easily distributes itself through the spacing created by the backwash pressure between the expanded filter media and the rigid tube.

Again, when the pressure filtration period is initiated, the filter media sleeve contracts against the rigid porous backing tube, whereby in turn the chance of blinding of the media is reduced or minimized.

A modified form of the rotary valve member in FIG. 12 is provided with a pair of radial extensions or outlet end portions 64c which are diammetrically opposed symmetrical with respect to one another, cooperating with the port openings of the valve plate 32. Accordingly, in the operation, a central downward pressure force "F–1" is dimensioned so as to exceed the sum of the two upward pressure forces "F–2" to insure uniformly balanced operating contact of the valve member with the valve plate 32.

In the modified apparatus of FIG. 13 each of the groups of filter elements is contained in a separate tank 76. Feed pulp or slurry is supplied to these tanks under pressure from a single source represented by a supply header 77.

Each tank, therefore, has a tube plate 78 with depending tubes 79, and sludge withdrawal means comprising a pump 80 and a sludge discharge valve 81. A separate control valve unit- or valve construction 82 substantially similar to the one mounted atop the tank in the FIG. 1 embodiment, in a cyclic operation supplies backwash liquid sequentially to the tanks 76 by way of respective conduits 83 connecting the valve plate 84 through valves 85 with the respective top end chambers 86 of the respective tanks. Accordingly, in the operation of this arrangement one tank may be backwashed at a time, while the others are being subjected to pressure filtration. For example, while tank No. 3 is being backwashed as indicated by arrows A, the other tanks Nos. 1, 2, 4, 5, 6 produce filtrate liquid flowing in the opposite direction as indicated by arrows B.

Each tank has a sludge agitator mechanism 87 substantially of the kind shown in FIG. 1.

I claim:
1. In a continuous pressure filter apparatus for thickening a feed slurry to deliver filtrate liquid and a thickened sludge,
   wherein a plurality of groups of depending filter tubes closed at the lower end, having their upper ends connected to a corresponding plurality of filtrate receiving chambers, are maintained continuously in a body feed slurry supplied under pressure from a single source, thereby causing feed solids to collect on the filter tubes and filtrate liquid being forced through the tube walls to pass upwardly from the respective groups into the respective receiving chambers,
   a control valve construction connected to said receiving chambers and operable for collecting and delivering filtrate liquid from said groups of filter tubes, while forcing backwash liquid sequentially into said receiving chambers in a reverse flow direction at a pressure exceeding that of the feed slurry pressure,
   said valve construction comprising a valve plate having port openings evenly spaced from one another about an axis, and communicating with respective filtrate receiving chambers;
   a valve housing mounted on said valve plate to surround said port openings;
   an annular partition in the housing extending transversely of said axis and peripherally fixed to said housing, substantially dividing the housing into a filtrate collecting compartment adjacent to and directly communicating with said port openings, and a feed chamber for the backwash liquid;
   a rotary distributing valve member located in said filtrate collecting compartment and mounted for rotation about said axis, providing a conduit to establish flow communication from said feed chamber to said port openings sequentially incident to rotation of the valve member, said rotary valve member comprising a cylindrical inlet portion concentric with said axis and with the central opening in said partition, a hollow body portion connected to the neck portion, and having a bottom in operating contact with that area of the valve plate which is surrounded by the port openings, an outlet portion extending radially from said body portion in face-to-face contact with said valve plate, and having a bottom opening adapted to sequentially register with said port openings incident to rotation of said valve member, and having a bottom face co-planar with the bottom face of said body portion, in operating contact with the valve plate, said valve member being constructed and arranged for maintaining and insuring face-to-face working contact between the valve member and the valve plate as a result of hydraulic pressure force acting through said neck portion of the valve member in excess of the oppositely directed pressure effect acting through said bottom opening of the valve member;
   sealing means effective between said neck portion of the valve member and said annular partition, to functionally separate the filtrate discharge chamber from the back wash receiving chamber;
   means for centering said valve member relative to said valve plate;
   and actuating means for rotationally moving said valve member on said valve plate.

2. The valve construction according to claim 1, wherein said actuating means comprise a shaft operatively connected to said bottom of the valve member, and extending axially therefrom through the outer end of said valve housing in sealing relationship therewith.

3. The valve construction according to claim 1, wherein said valve member has an internal hub portion extending from said bottom concentric with said axis, said hub having an axial bore, wherein a round plug is fixed in said bore so as to project outwardly from said bottom for centering said valve member on said valve plate, and wherein said actuating means comprise a shaft having one end loosely fitted in said bore in torque transmitting relationship with said hub portion, said shaft extending axially from said hub portion through the outer end of said valve housing in sealing relationship therewith.

4. The valve construction according to claim 1, wherein said central opening in the annular partition is formed with a hub portion, and sealing means are provided effective between said hub portion and the neck portion of the rotary valve member.

5. The valve construction according to claim 1, wherein the bottom of said valve member has a shallow annular recess providing concentric annular contact faces engaging the valve plate.

6. The valve construction according to claim 1, wherein the valve member has a body portion of a diameter greater than the neck portion so as to constitute therewith an annular shoulder portion.

7. The valve construction according to claim 1, wherein the valve member has a body portion of diameter greater than the neck portion so as to constitute therewith an annular shoulder, wherein the bottom of said valve member has a shallow annular recess concentric with said axis, providing concentric contact faces engaging the valve plate, and wherein at least one pressure relief duct is provided for said recess.

8. The valve construction according to claim 1, wherein the radial outlet end portion of said valve member has a pair of oppositely directed lateral wing portions extending horizontally from the leading side and from the trailing side respectively of said radial portion, and providing blank-off faces in working contact with said valve plate.

9. The valve construction according to claim 1, wherein said valve member has a pair of oppositely directed radial outlet end portions cooperating with the port openings.

10. The valve construction according to claim 1, wherein said annular partition comprises an annular shelf extending inwardly from the wall of the housing, an annular plate member having its peripheral edge portion supported by said shelf, and fastening means for securing said plate member on said shelf concentric with said axis.

11. The valve construction according to claim 1, with the addition of an auxiliary plate attached to the outer face of the valve plate, and having flow passage openings registering with the port openings of the valve plate, a butterfly valve member mounted in each of said flow passage openings, a shaft for said valve member extending radially of said vertical axis, and having an outer end portion projecting outwardly from the periphery of the auxiliary plate, means for manually rotating said shaft for either opening or closing the respective flow passage opening by said butterfly valve member.

References Cited

UNITED STATES PATENTS

| | | | |
|---|---|---|---|
| 2,391,534 | 12/1945 | Yerrick et al. | 55—294 X |
| 3,169,109 | 2/1965 | Hirs | 210—333 X |
| 3,283,903 | 11/1966 | Muller | 210—333 X |
| 3,356,215 | 12/1967 | Miles | 210—82 |

REUBEN FRIEDMAN, *Primary Examiner.*

F. A. SPEAR, JR., *Assistant Examiner.*

U.S. Cl. X.R.

210—411